(12) United States Patent
Goto et al.

(10) Patent No.: US 6,416,570 B2
(45) Date of Patent: Jul. 9, 2002

(54) INTEGRALLY MOLDED TYPE FILTER UNIT AND MANUFACTURE OF THE SAME

(75) Inventors: Sadahito Goto, Ohtsu; Mitsuhiko Akiyama, Osaka; Shinichi Minemura, Ohtsu, all of (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/795,978

(22) Filed: Mar. 1, 2001

(30) Foreign Application Priority Data

Mar. 2, 2000 (JP) .......................................... 2000-056616

(51) Int. Cl.[7] .......................... B01D 46/52; B29C 45/14
(52) U.S. Cl. ........................ 96/134; 55/509; 55/DIG. 5; 55/497; 55/502; 55/524; 210/493.3; 264/274; 264/DIG. 48; 96/153
(58) Field of Search .................... 55/385.3, 422, 55/497–499, 502, 507, 509, 511, 521, 524, DIG. 5, DIG. 31; 96/108, 134, 153; 95/90; 210/493.3, 493.5; 264/257, 274, 276, DIG. 48

(56) References Cited

U.S. PATENT DOCUMENTS

| 4,569,813 A | * | 2/1986 | Taki et al. ................... 264/259 |
| 4,701,197 A | * | 10/1987 | Thornton et al. ........... 210/491 |
| 5,043,000 A |   | 8/1991 | Kadoya ........................ 55/484 |
| 5,338,253 A |   | 8/1994 | Damsohn et al. ........... 454/158 |
| 5,352,274 A | * | 10/1994 | Blakley ......................... 95/90 |
| 5,603,753 A | * | 2/1997 | Krull et al. .................... 96/121 |
| 5,667,545 A |   | 9/1997 | Honda et al. ................. 55/497 |
| 5,679,122 A | * | 10/1997 | Moll et al. ..................... 55/497 |
| 5,891,207 A |   | 4/1999 | Katta ......................... 55/385.3 |
| 5,902,361 A | * | 5/1999 | Pomplun et al. ........... 55/385.3 |

FOREIGN PATENT DOCUMENTS

| DE | 0 370 222 A2 |   | 10/1989 |
| JP | 57030526 A | * | 2/1982 |
| JP | 10 263348 |   | 6/1998 |
| JP | 11 90150 |   | 6/1999 |

OTHER PUBLICATIONS

Patent Abstracts of Japan, vol. 009, No. 171 (C–291), Jul. 16, 1985 and JP 60–41517A, (Touyouroki Seizou).
Patent Abstracts of Japan, vol. 013, No. 111, (C–577), Mar. 16, 1989, and JP 63–287521 A (Shuji Harada et al.).

* cited by examiner

Primary Examiner—Duane Smith
Assistant Examiner—Frank M. Lawrence
(74) Attorney, Agent, or Firm—Foley & Lardner

(57) ABSTRACT

A filter unit comprising a filter part made of an adsorbent-bearing filtration material and characterized in that said filter part is integrally molded with a filter holding frame made of a thermoplastic resin and that the adsorbent of the filter part is packed to the position contacting the filter holding frame.

19 Claims, 3 Drawing Sheets

INTEGRALLY MOLDED TYPE FILTER UNIT AND MANUFACTURE OF THE SAME

BACKGROUND OF THE INVENTION

1. Field of the Invention

The present invention relates to an integrally molded type filter unit and a method for manufacturing the filter unit, more particularly to a filter unit possible to be produced by joining a filter holding frame to a separately produced filter part simultaneously with injection molding of the frame, installation easiness to be installed in a gas treatment apparatus, light weight and having low pressure loss and high dust collecting efficiency and to a manufacturing technique of the filter unit.

2. Description of the Related Art

Recently, the demand for a gas treatment apparatus such as an air purifier, an air conditioner equipped with such an air purifier, and the like has been increasing.

The gas treatment apparatus usually contains a filter for removing airborne dust and malodorous components. Such a filter is used as a filter unit comprising a filter part made of activated carbon-containing paper, polyester nonwoven cloths, glass fiber paper and formed in a sheet-like form or processed in a pleated form and a filter holding frame to which the filter part is attached. The filter unit is required to be easy for installation in a gas treatment apparatus.

Conventionally, in the case of manufacturing such a filter unit, a filter part previously processed to be a sheet-like shape or a pleated shape is made ready, built in a filter holding frame separately made ready and then fixed in the filter holding frame by methods, for example, by using an adhesive, engagement claws and screws, or springs. Consequently, there occurs a problem that the number of processes is high and the manufacturing efficiency is decreased.

Today, the following methods have been made known: as disclosed in Japanese Patent Unexamined Publication (Kokai) No. 10-263348, a method of integrally forming a filter unit using a packing in the circumference of a filter holding frame and as disclosed in Japanese Patent Unexamined Publication (Kokai) No. 11-90150, a method of using a foamed resin for a filter holding frame.

However, the methods aim at mainly improving the production efficiency but pay no attention to improvement of properties such as the strength and the weight of a filter unit itself and the capability and the characteristic as a filter.

An integrally molding method wherein a filter part made ready in a separated process is stuck to a filter holding frame simultaneously with the molding of the filter holding frame can be considered as a method for manufacturing a filter unit with a high strength and light weight at high manufacturing efficiency.

However, the integrally molding method also has a problem especially in the case where an adsorbent of such as an activated carbon is contained in a filter part. That is, the surface area of a filter part is widened to improve the function of an adsorbent even a little more, the joining part to a holding frame is lessened as much as possible to improve the dust collecting efficiency, and even the end part of a holding frame is filled with activated carbon to improve the filter molding processibility and such methods are considered to achieve such improvements, however these methods may possibly lead to burr formation or a damage on dies owing to separation of activated carbon from the end part of the filter material to a grip of the die.

Therefore, it can be considered to prevent burr formation and the damage of dies that no activated carbon is put in the end part of a filter material, however it causes a problem that the effective surface area as a filter is narrowed and the filter capability is decreased.

Further, it can also be considered to prevent burr formation and activated carbon separation that a resin flow-in part with a several mm width is formed in the grip part in the inner side of the frame by properly amending the die structure, however it causes a problem that the effective surface area as a filter is narrowed and the filter capability is decreased.

On the other hand, a filter holding frame for installing a filter in a gas treatment apparatus is desired to be excellent in handling flexibility as to be freely twisted or changed in the form at the time of installation and is preferable to be thin and light weight, however if the holding frame is made thin and light weight, the strength of the frame is decreased and it results in a problem that the frame is hard to be installed in a gas treatment apparatus, especially in a curved one.

SUMMARY OF THE INVENTION

The present invention hence aims at providing a filter unit having a wide effective surface area of a filtration material and capable of providing a high dust collecting efficiency without causing drop of the activated carbon from the end part of the filtration material of the filter to a grip part of dies and the present invention aims at providing a method for manufacturing such a filter unit.

The present invention further aims at providing a filter unit with light weight by making the thickness of the filter holding frame thin, excellent handling flexibility at the time of installation, a low pressure loss, and a high collecting efficiency and providing a method for manufacturing such a filter unit comprising an integrally molding process to simplify manufacturing processes and to lower the fraction defective in the manufacturing processes.

A filter unit according to the present invention is characterized by comprising a filter part made of an adsorbent-bearing filtration material and a filter holding frame made of a thermoplastic resin and integrally molded with a part of the filter part and the adsorbent of the filter part is packed to the position contacting the filter holding frame.

With such a constitution, a filter unit with a wide effective surface area of the filtration material and a high collection efficiency can be provided without causing burr formation or damages on dies owing to separation of the adsorbent, e.g. activated carbon, from the end part of the filtration material of the filter to a grip part of the die. Such a filter unit can be manufactured by a method, which will be described below, developed by inventors of the present invention.

The filter part in the present invention is a sheet-like or sheet-pleated product produced from paper, polyester or other polymer nonwoven cloths, glass fiber paper, porous resin sheets, various types of fabrics and textiles containing an adsorbent such as activated carbon, zeolites, and the like and subjected to the integrally molding process with a filter holding frame.

The materials for the filter holding frame to be employed for the present invention include thermoplastic resins such as acrylic resins, phenol resins, silicon resins, polyolefin resins, polyurethane resins, epoxy resins, polyester resins, poly(vinyl chloride) type resins, melamine resins, poly (vinyl acetate) type resins, polystyrene resins, and the like; thermoplastic elastomers such as styrene type thermoplastic elastomer, urethane type thermoplastic elastomer, olefin type thermoplastic elastomer, polyester type thermoplastic elastomer, polyamide type thermoplastic elastomer, vinyl chloride type thermoplastic elastomer, fluoro type thermoplastic elastomer, and the like; and any material which can be molded by molten injection molding.

The filter holding frame is preferable to have ribs in the side faces in the filtration material arrangement direction and the width of each rib is preferably 10 to 90% and more preferably 15 to 40% to the width of each side face in the filtration material arrangement direction of the filter holding frame. The thickness of each rib is preferably 10 to 70% and more preferably 20 to 50% to the thickness of each side face in the filtration material arrangement direction.

If the width of each rib is 10% or narrower to the width of the side faces of the holding frame, sufficient strength cannot be provided and hence it is not preferable. If the width is 90% or wider to the width of the side faces of the holding frame, the reinforcing effect can be provided, however it means that the side face thickness is thickened and that the holding frame cannot be light weight. By forming such ribs, as a practical example, in the case where the gap (the thickness) of the side faces (in the filtration material arrangement direction) of a filter holding frame of dies is controlled to be 2.005 mm or narrower, preferably 1.504 mm or narrower, the thickness of the side faces of a manufactured holding frame can be made to be 2 mm or thinner, preferably 1.5 mm or thinner.

In such a manner, even a resin such as an olefin type thermoplastic resin whose melt has a high viscosity can easily be injection-molded and the thickness of the side faces (in the filtration material arrangement direction, the width direction) of a filter holding frame can be thin and the installation easiness can be improved. Moreover, the degree to which the side faces (in the filtration material arrangement direction) of the filter holding frame is thinned can be compensated with the filter part to result in increase of the surface area of the filter part by the degree and consequently, the pressure loss can be lowered and the collection efficiency can be improved. Such a thin holding frame made of a thermoplastic resin, especially an olefin type thermoplastic elastomer, has not been made available before.

Further, the foregoing filter holding frame is preferable to have gates in 3 or more points in side faces in the filtration material arrangement direction. More preferably, gates are formed at 4 to 6 points.

Formation of the ribs and gates improves the fluidity of a melted resin at the time of injection molding and the melted resin is spread all over the dies within a short time and at the same time pressure is evenly applied to the whole gap of the dies to spread the resin without leaving any voids. As a result, a filter part positioned in the outlet side of the dies and the melted resin are almost perfectly brought into contact with each other without leaving any voids. Further, since the gap of the dies can be made narrow, the thickness of the produced filter holding frame can be thin. To be remarkable, the hardened resin is found reinforcing the side faces (filtration material arrangement direction) of the filter holding frame to significantly improve the strength of the produced filter and make the filter durable to the strain and impact.

The foregoing thermoplastic resin is preferably an olefin type thermoplastic elastomer. That is because the elastomer is especially excellent in impact durability and it is desirable.

A conventional method aims at improving the productivity by simplifying the processes and dies for filter holding frames are only for pouring a melted resin to the gap part of the dies, whereas the present invention provides a method developed based on investigation of the structure of dies to easily carry out injection molding of even a resin such as an olefin type thermoplastic elastomer whose melt viscosity is high, to thin the thickness of the side faces (in the filtration material arrangement direction and the width direction) of a filter holding frame, and to improve the installation easiness. Further, the degree to which the side faces (in the filtration material arrangement direction) of the filter holding frame is thinned can be compensated with the increase of a part of the filter and as a result, the pressure loss can be lowered and the collection efficiency can be improved.

Before, it has been said impossible to make a resin such as an olefin type thermoplastic elastomer, whose melt viscosity is high, thin in the thickness of the side faces (in the filtration material arrangement direction and the width direction) of a filter holding frame. A melted resin poured into dies from both sides in the filtration material width direction of the filter holding frame joins in the center part of the side faces (in the filtration material arrangement direction) of the filter holding frame. At that time, if the gap of the dies equivalent to rib parts is made thin, the short takes place at the time of the injection molding. The term, short, means that resin is not spread all over the dies for molding a filter holding frame and cooled and solidified while partially leaving voids and subsequently, causes uneven strength pattern and as a result partly defective parts are formed in the produced holding frame in the voids. However, owing to the formation of ribs, occurrence of the short is prevented and the inferior product production is decreased. Moreover, the strength of the whole body of a filter holding frame is increased and the filter holding frame is freely deformable at the time of installation and a problem of installation difficulty at the time of installing a filter holding frame in a curved gas treatment apparatus is solved. Without ribs and gates, a melted resin flows unevenly in the dies and uneven temperature distribution pattern is formed and subsequently cooling speed differs and an uneven strength pattern is formed in the side face parts of the cooled and solidified filter holding frame to result in short occurrence and inferior product formation.

The foregoing filter holding frame is preferable to have 1% or higher torsion defined as following equation:

$$\text{torsion} = [(L)/(W)] \times 100\%$$

(wherein, (L) denotes the distance in which a filter holding frame is moved owing to the strain when force is applied to the filtration material face in one end of the filter holding frame in the vertical direction while a side face in the opposed other end of the holding frame being fixed in the filtration material width direction; and (W) denotes the width of the holding frame).

The torsion is more preferably 10% or higher and furthermore preferably 25% or higher.

The twisting of a filter unit at the time of installing the unit in a gas treatment apparatus means the temporal deformation caused by the force applied to the filter unit at the time of insertion and the degree of the deformation is defined as the above-mentioned equation and represents the characteristic. That is, the torsion is defined as the value calculated by dividing the distance (L) in which a filter holding frame is moved owing to the strain when force is applied to the filtration material face in one end of the filter holding frame in the vertical direction while a side face in the opposed other end of the holding frame being fixed in the filtration material width direction with the width of the holding frame (W) and multiplying the obtained value by 100.

The smaller the torsion is, the tougher the holding frame is and the harder the holding frame is deformed and it means that installation in a curved gas treatment apparatus become more difficult. The torsion is sufficient to be at least 1% and in the case of 10% or higher, preferably 25% or higher, there is no trouble at the time of installation in a curved treatment apparatus.

The method for manufacturing a filter unit according to the present invention comprises a process of setting a filter part made of an adsorbent-bearing filtration material in dies, a process of pouring a thermoplastic resin in the dies in which the filter part is set and forming a filter holding frame integrally with the foregoing filter part.

The clearance A of an escape part in the foregoing dies is controlled to be 80 to 115% to the thickness of the foregoing filtration material, the clearance B in the grip part is controlled to be 25 to 45% to the thickness of the foregoing filtration material, and the distance C of the foregoing grip part is controlled to be 0.5 to 5 mm.

By controlling the clearance A of the escape part is controlled to be 80 to 115%, preferably 100 to 110%, the clearance B in the grip part is controlled to be 25 to 45%, preferably 35 to 40%, and the distance C of the grip part is controlled to be 0.5 to 5 mm, preferably 1 to 3 mm, the present invention can keep the surface area of the filtration material wide and provide an excellently integrally molded filter.

In this case, the clearance means the gap between dies sandwiching the filtration material part of the filter, that is, the distance between the cavity side and the core side. The grip part is positioned in the boundary of the filtration material of the filter to the holding frame and means another filtration material part of the filter, that is a part where the clearance is made narrow than the escape part. By forming the grip part and the escape part, a melted thermoplastic resin does not flow into the filtration material part and the filtration material structure can be formed without being damaged. Even if activated carbon is deposited in the filter terminal parts, the filter can easily be stuck to a holding frame by adjusting the A, B, C values and thus the present invention is completed.

With such a constitution, when a melted resin is poured to dies, bleeding of the melted resin to a filtration material does not take place and the filtration material of a filter can utilized to the utmost extent. If the clearance A is set 80% or lower, the filtration material of the filter is possibly pressurized and damaged and the pressure loss may be increased. If the clearance A is set 115% or higher, the pleated form of the filter part is possibly deformed and wrinkled. If the clearance B is set 25% or lower, too, the filtration material of the filter is possibly pressurized and damaged and the pressure loss may be increased. If the clearance B is set 45% or higher, the resin possibly flows out to the filter part and burrs may be formed. Further, if the distance C of the grip part is set 0.5 mm or shorter, too, the resin possibly flows out to the filter part and burrs may be formed and if the distance C is set 5 mm or longer, the surface area of the filter part is possibly decreased and the filtration capability is decreased and thus these are not preferable.

DETAILED DESCRIPTION OF THE PREFERRED EMBODIMENTS

The preferred embodiments of a filter unit and its manufacture according to the present invention will be described in detail with reference to figures.

Figure 1A:
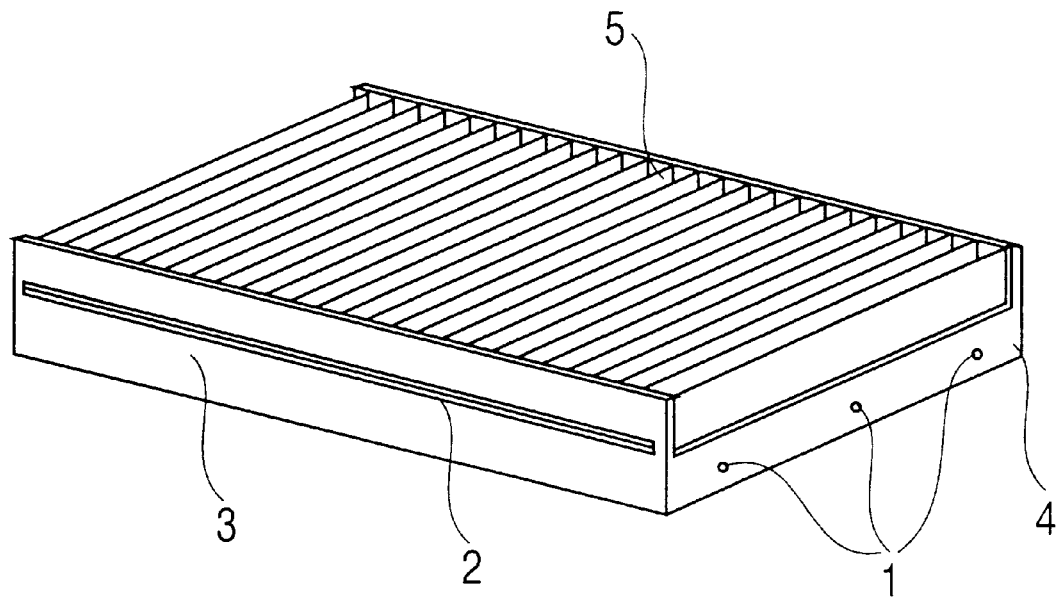
FIG. 1A shows a perspective view of a filter unit manufactured by a method of the present invention and FIG. 1B shows a side face figure of the filter unit shown in FIG. 1A.
Figure 1B:
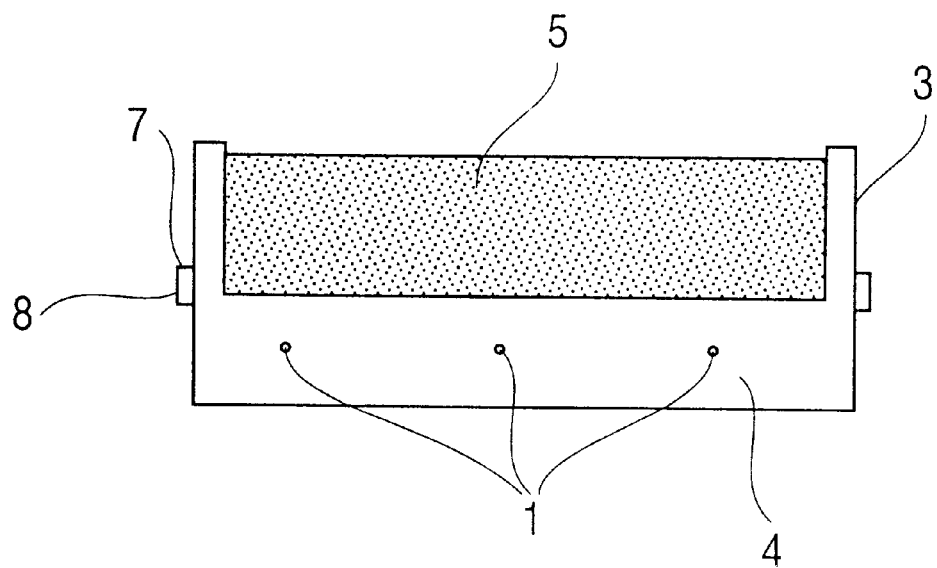
Figure 2:
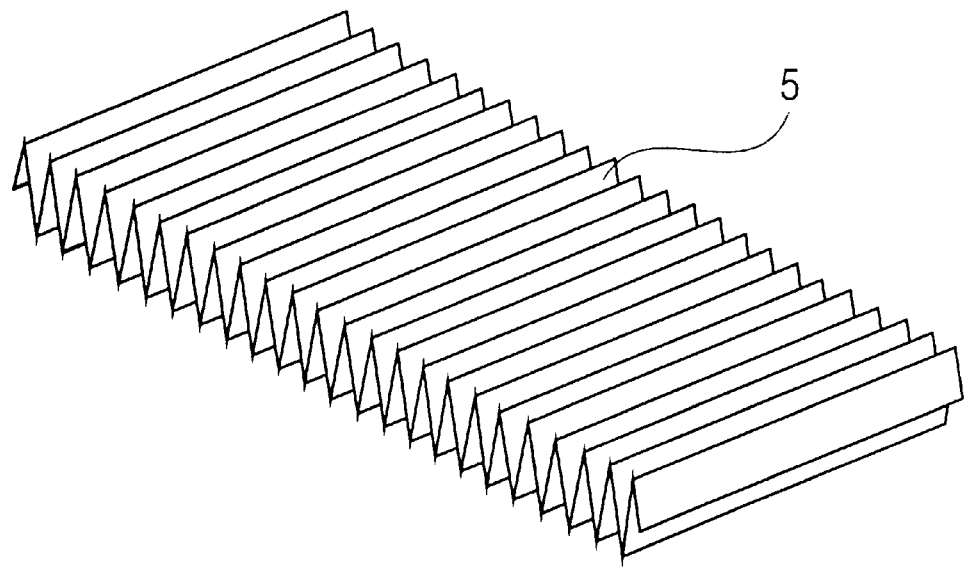
FIG. 2 shows a perspective view of a pleated filtration material to be a filter part.
Figure 3:
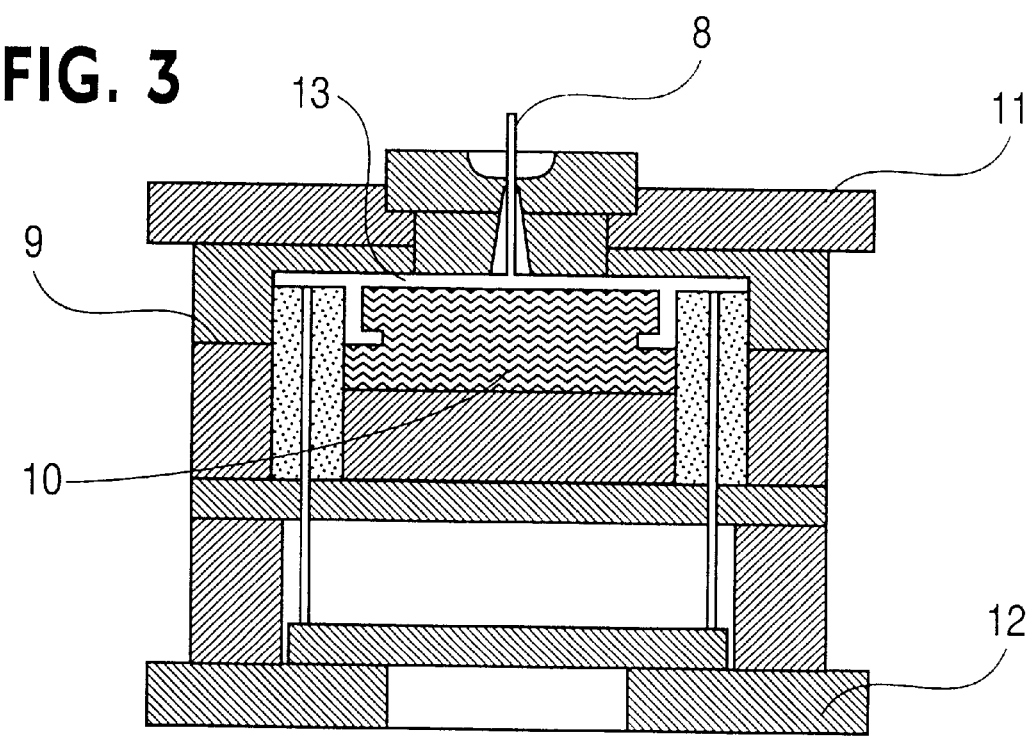
FIG. 3 shows the cross section figures of molding dies for manufacturing a filter unit according to the present invention.
Figure 4:
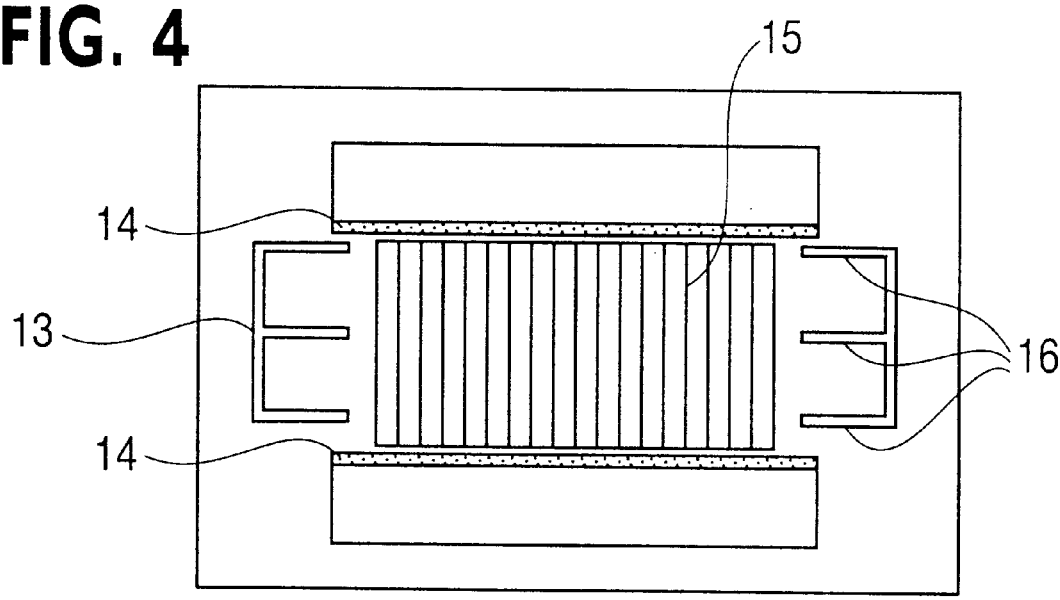
FIG. 4 shows a schematic plane figure of a lower die of the molding dies shown in FIG. 3.

This integrally molded type filter unit can be produced to be in a form shown in FIG. 1A and FIG. 1B by assembling and setting a filter part 5, which is made ready in another process and formed in a sheet-like shape or processed in pleated state as shown in FIG. 2 using a nonwoven fabric containing an adsorbent such as activated carbon, in dies for a filter holding frame as illustrated in FIG. 3 and FIG. 4 and injection-molding a thermoplastic resin. Simultaneously with that, the filter part and the holding frame are joined to each other to give filter unit in the form shown in FIG. 1A and FIG. 1B.

The method for manufacturing the filter unit according to the present invention is an integrally molding method for sticking a filter part made of a filtration material 5 previously mad ready in another process to a filter holding frame simultaneously with molding of the filter holding frame. By making the thickness of the side faces of the filter holding frame thin, the weight is made light and the installation easiness is improved and at the same time the surface area of the filter part is increased to the extent by the degree to which the thickness is made thin to lower the pressure loss and improve the collection efficiency of the resultant filter unit. In addition to that, the present method can simplify the manufacturing processes and lower the fraction defective.

The filter unit whole body relevant to an embodiment of the present invention is shown in FIG. 1 and the filter part is shown in FIG. 2 and the dies to be employed for the integrally molding process are shown in FIG. 3 and FIG. 4. In the FIG. 1, the reference number 3 denotes the side face of the filter holding frame in the filtration material arrangement direction and the reference number 4 denotes the side face of the filter holding frame in the filtration material width direction. The groove for which the reference number 14 is assigned in FIG. 4 forms a rib (the reference number 2 in FIG. 1 is assigned to: the reference number 6 in the same FIG. 1B shows the rib width and the reference number 7 shows the rib thickness) in the outside of the side face (in the filtration material arrangement direction) of the injection-molded filter frame part. The reference number 16 in the FIG. 4 corresponds to a gate (the reference number 1 in FIG. 1 is assigned to) positioned in the face of the filter frame part in the filtration material width direction. Incidentally, the reference number 10 shown in FIG. 3 and FIG. 5 denotes the serration part of the lower die in which the sheet for the filter 5 is set in pleated state.

Figure 5:
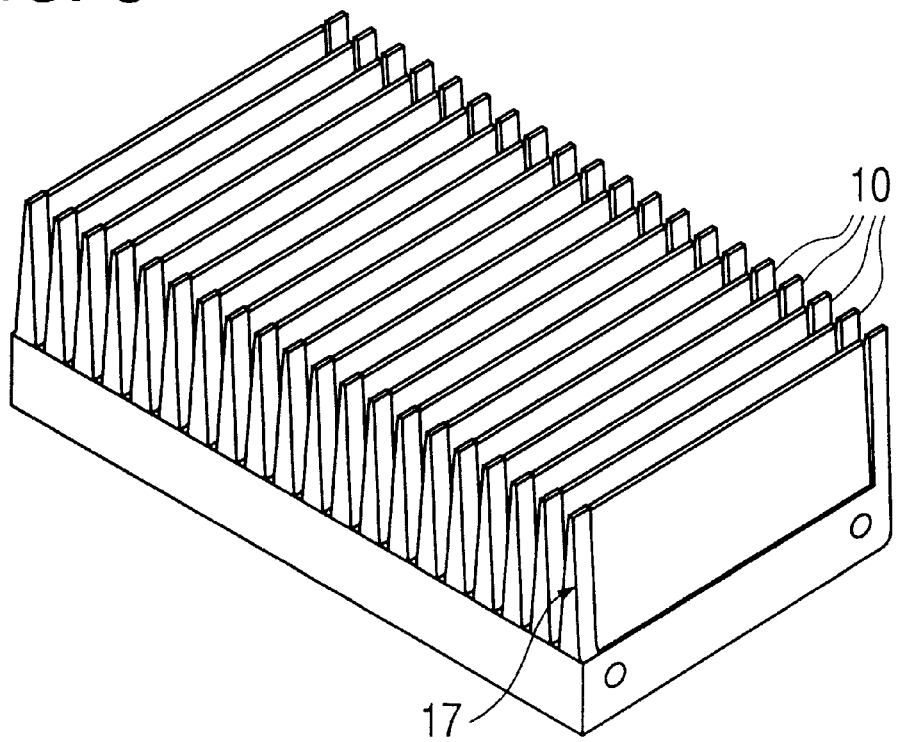
FIG. 5 shows a perspective view showing the lower die of the molding dies in which the filter part shown in FIG. 2 is installed.

The filter holding frame is composed of two upper and lower separate dies 11, 12: an upper die in the fixed side and a lower die in the movable side. That is, the filtration material 5 is put between the two dies 11, 12 and the filter holding frame is produced from a resin by injection-molding in the cavity formed between the upper and the lower dies and simultaneously the holding frame and the filtration material 5 are joined together. In the case manner as that in a normal injection molding, a melted resin flows in resin fluidizing routes 8, 13 shown in FIG. 3 and is spread to the dies from the gates 1 in the side face in the width direction of the pleats of the filter holding frame. The resin introduction is carried out by introducing the resin from side faces in both sides in the width direction of the pleated filtration material of the filter holding frame and joined in the center of the side faces in the filtration material arrangement direction of the filter holding frame. At that time, owing to the formation of the ribs and gates, the melted resin can flow quickly and is smoothly spread to the gap all over the dies, so that the above described short does not take place. In general, the flow-in of the melted resin to the dies is completed within 15 to 20 seconds. After that, it takes 30 to 35 second to cool the inside of the dies. After the cooling, the dies 11, 12 are separated up and down to obtain an aiming filter unit. The reference number 9 in FIG. 3 shows the joined figure of the upper and the lower dies Further, the schematic figure of the dies for fixing the filtration material 5 and forming the holding frame is shown in FIG. 5. The clearance A of an escape part is controlled to be 80 to 115% to the thickness of the foregoing filtration material, the clearance B in the grip part 17 is controlled to be 25 to 45%, and the distance C of the grip part 17 is controlled to be 0.5 to 5 mm, preferably 1 to 3 mm. Melting adhesion can perfectly be carried out by pressure joining the cavity and the core without causing bleeding of the melted resin for the holding frame to the filtration material. As a result, the filtration material and the holding frame can be joined to each other without causing separation of the activated carbon in the filtration material and damages on the filtration material and the activated carbon-containing filtration material and the holding frame can directly be joined to each other. Consequently, the effective surface area of the activated carbon-containing filtration material is widened and that contributes to remarkable improvement of the filter capability.

The gap between the dies for the holding frame part can be narrowed, that is, the thickness of the produced filter holding frame can be made thin. To be further remarkable, the hardened resin can reinforce the side faces (filtration material arrangement direction) of the filter holding frame to significantly improve the strength of the produced filter.

In the case of manufacturing a filter unit using the dies of the embodiment of the present invention, separate production one by one is possible, however since the occurrence of defective products owing to the short is almost zero, the method is suitable for continuous production and possible to improve the productivity. Further, since the filter unit has excellent installation easiness, the filter unit is suitable to be used for vehicles, however the use of the filter unit is not at all restricted to such a purpose and the filter unit is suitable for a wide range of use purposes for a gas treatment apparatus.

Hereinafter, examples of integrally molded type filters of specific embodiments of the present invention and comparative examples will be described, however the present invention is not at all restricted to these examples and allows any alterations and modifications as fall within the true scope of the present invention.

At first, the evaluation and measurement methods relevant to the examples and the comparative examples will be described below.

(1) The properties and capabilities of filtration materials to be used for filter parts were evaluated by the following tests.

[Filtration Material Thickness]

The thickness was measured by a thickness meter of a measurement terminal of 25 mm$\phi$ at measurement load of 7 gf/cm$^2$.

[Toughness]

Measured by a method according to JIS L 1096 8.19 B.

[Modulus of Compressive Elasticity]

Measured by a method according to JIS L 1096 8.18.

[Pressure Loss of Filtration Material]

The ventilation resistance of filtration materials was measured at wind velocity of 48 cm/s.

[Toluene Removal Efficiency of Filtration Material]

The removal capability by one pass using 80 ppm of toluene was measured. The concentration in the upstream side and in the downstream side at wind velocity of 23 cm/s was measured using a hydrocarbon meter made by Shimadzu Corporation. The removal efficiency was calculated according to the following equation:

toluene removal efficiency=(downstream side concentration/upstream side concentration)×100 [%].

(2) The properties and capabilities of filter units were evaluated in terms of the following items.

[Effective Surface Area of Filter Part]

The effective surface area of filtration materials of filter parts in filter units was measured by a method according to JIS L 1096 8.18.

[Resin Use Amount]

The rein amount of polypropylene used for holding frames was measured.

[Fraction Defective of Molding]

The fraction defective was calculated from the number of defects (burrs, short, rupture of filtration materials, occurrence of deformation) formed in 2000 shots of injection-molding based on the following equation:

the fraction defective=(the number of defects/2000 shots) ×100 [%].

[Pressure Loss]

The ventilation resistance of filter units was measured at flowrate of a wind of 600 m$^3$/hr.

EXAMPLE 1

As a filter part, an activated carbon-containing sheet having 1.1 mm filtration material thickness, 22 to 26 kg-cm toughness in the width direction, 45 to 50% modulus of compressive elasticity in the thickness direction, 50% or higher toluene removal efficiency of the filtration material, and 90 Pa or lower filtration material pressure loss was pleated in 39 mm height of pleats and 9 mm intervals of pleats and then cut in 105.5 filtration material width. The filtration material 5 was inserted into the insert part, that is, the filtration material insertion part 15, of the dies previously made ready and shown in FIG. 4. The clearance A of the escape part in the dies was controlled to be 105% to the thickness of the filtration material, that is, 1.16 mm; the clearance B in the grip part to be 40%, that is, 0.44 mm; and the distance C of the grip part to be 1.5 mm. The filtration material 5 was inserted into the dies and polypropylene resin (produced by C & CTECH Co.) melted at 215° C. was poured to the gap between dies as shown in FIG. 4 by an injection-molding apparatus from gates at 6 points through resin fluidizing routes 8 of the dies shown in FIG. 3 by applying pressure of 50 kgf/cm$^2$. At that time, the injection time to the dies was 15 seconds and cooling after the injection was carried out for 35 seconds.

After that, the dies were separated up and down to take out a filter unit. Consequently, a filter unit was obtained and the filter unit had the filter unit outer size of 106 mm×222 mm×40 mm, the filter part size of 103 mm×216 mm×39 mm, pleat intervals of 9 mm and comprised a filter holding frame having the holding frame thickness of 1.5 mm, the rib thickness of 0.5 mm, and the rib width 6 mm. The properties of the filter unit as a filter were measured.

EXAMPLE 2

The same filter part as that of Example 1 was used. The formation method of the filter unit was also same as in Example 1 except that the dies were so constituted as to control the clearance A of the escape part be 103% to the thickness of the filtration material, that is, 1.13 mm; the clearance B in the grip part to be 35%, that is, 0.39 mm; and the distance C of the grip part to be 3 mm, that the thickness of the flowing-in part of the dies was changed, and that the thickness of the holding frame was changed to be 3 mm.

COMPARATIVE EXAMPLE 1

The same filter part as that of Example 1 was used. The formation method of the filter unit was also same as in Example 1 except that the dies were so constituted as to control the clearance A of the escape part be 100% to the thickness of the filtration material, that is, 1.1 mm and no grid was formed.

COMPARATIVE EXAMPLE 2

The same filter part as that of Example 1 was used. The formation method of the filter unit was also same as in Example 1 except that the dies were so constituted as to control the clearance A of the escape part be 70% to the thickness of the filtration material, that is, 0.77 mm; the clearance B in the grip part to be 40%, that is, 0.44 mm; and the distance C of the grip part to be 1.5 mm.

COMPARATIVE EXAMPLE 3

The same filter part as that of Example 1 was used. The formation method of the filter unit was also same as in Example 1 except that the dies were so constituted as to control the clearance A of the escape part be 130% to the thickness of the filtration material, that is, 1.43 mm; the clearance B in the grip part to be 40%, that is, 0.44 mm; and the distance C of the grip part to be 1.5 mm.

COMPARATIVE EXAMPLE 4

The same filter part as that of Example 1 was used. The formation method of the filter unit was also same as in Example 1 except that the dies were so constituted as to control the clearance A of the escape part be 105% to the thickness of the filtration material, that is, 1.16 mm; the clearance B in the grip part to be 60%, that is, 0.66 mm; and the distance C of the grip part to be 1.5 mm.

COMPARATIVE EXAMPLE 5

The same filter part as that of Example 1 was used. The formation method of the filter unit was also same as in Example 1 except that the dies were so constituted as to control the clearance A of the escape part be 105% to the thickness of the filtration material, that is, 1.16 mm; the clearance B in the grip part to be 40%, that is, 0.44 mm; and the distance C of the grip part to be 6 mm.

The measurement results of the foregoing Examples 1, 2 and Comparative Examples 1 to 5 were shown in Table 1.

TABLE 1

| | Clearance A [%] | Clearance B [%] | Distance C [mm] | Effective surface area of filter part [$m^2$] | Resin use amount [g] | Molding fraction defective [%] | Toluene removal efficiency [%] | Pressure loss [Pa] | Holding frame thickness [mm] |
|---|---|---|---|---|---|---|---|---|---|
| Example 1 | 105 | 40 | 1.5 | 0.178 | 47.3 | 1 | 52 | 155 | 1.5 |
| Example 2 | 103 | 35 | 3 | 0.178 | 56.8 | 1 | 51 | 157 | 3 |
| Comparative Example 1 | 100 | — | — | 0.183 | 47.3 | 85 | 52 | 155 | 3 |
| Comparative Example 2 | 70 | 40 | 1.5 | 0.178 | 47.3 | 2 | 52 | 201 | 1.5 |
| Comparative Example 3 | 130 | 40 | 1.5 | 0.178 | 47.3 | 76 | 52 | 192 | 1.5 |
| Comparative Example 4 | 105 | 60 | 1.5 | 0.178 | 47.3 | 88 | 52 | 160 | 1.5 |
| Comparative Example 5 | 105 | 40 | 6 | 0.178 | 47.3 | 1 | 47 | 188 | 1.5 |

Further, the following is the description of the results of the measurement of the properties and capabilities, e.g. installation easiness to a gas treatment apparatus, of filter units of the embodiments according to the present invention.

Tests were carried out for airborne dust removal efficiency of the following filtration materials and filter units instead of the toluene removal efficiency of filtration materials, the torsion, and the installation easiness.

[Airborne Dust Removal Efficiency of Filtration Material]

The dust removal efficiency by one pass was measured using airborne dust of 0.3 $\mu$m. The concentration of the airborne dust of 0.3 $\mu$m in the upstream side and in the downstream side at wind velocity of 23 cm/s was measured using a powder dust measuring apparatus (trade name: RION PARTICLE COUNTER KC-01C). The airborne dust removal efficiency of a filtration material was calculated from the results.

[Airborne Dust Removal Efficiency of Filter Unit]

The dust removal efficiency by one pass was measured using airborne dust of 0.3 $\mu$m. The concentration of the airborne dust of 0.3 $\mu$m in the upstream side and in the downstream side at flow rate of 300 $m^3$/hr of air was measured using a powder dust measuring apparatus (trade name: RION PARTICLE COUNTER KC-01C). The airborne dust removal efficiency of a filter unit was calculated from the results.

[Torsion]

The torsion was calculated by measuring the distance in which a holding frame was moved owing to the strain when force was applied to the filtration material face in one end of the holding frame in the vertical direction while a side face in the opposed other end of the holding frame being fixed in the filtration material width direction, dividing the distance with the width of the side face of the holding frame and multiplying the obtained value by 100.

[Installation Easiness]

In the handling work at the time of installation of filter units in a stand of a gas treatment apparatus, those which could be installed by one time insertion were regarded to be excellent in handling property and those which required two or more repeated insertion works to be installed were regarded to be inferior in handling property.

EXAMPLE 3

As a filter part, a sheet having 1.1 mm filtration material thickness, 22 to 26 kg-cm toughness in the width direction, 45 to 50% modulus of compressive elasticity in the thickness direction, 40% or higher removal efficiency of airborne dust of 0.3 µm particle size, and 90 Pa or lower pressure loss was pleated in 39 mm height of pleats and 9 mm intervals of pleats and then cut in 105.5 filtration material width. The filtration material 5 was inserted into the insert part, that is, the filtration material insertion part 15, of the dies previously made ready and shown in FIG. 4. After the filtration material 5 was inserted into the dies, polypropylene resin (produced by C & CTECH Co.) melted at 215° C. was poured to the gap between dies as shown in FIG. 4 by an injection-molding apparatus from gates at 6 points through resin fluidizing routes 8 of the dies shown in FIG. 3 by applying pressure of 50 kgf/cm$^2$. At that time, the injection time to the dies was 15 seconds and cooling after the injection was carried out for 35 seconds. After that, the dies were separated up and down to take out a filter unit.

Consequently, a filter unit was obtained and it had the filter unit outer size of 106 mm×222 mm×40 mm, the filter part size of 103 mm×216 mm×39 mm, pleat intervals of 9 mm and comprised a filter holding frame having the holding frame thickness of 1.5 mm, the rib thickness of 0.5 mm, and the rib width 6 mm. The properties of the filter unit as a filter were measured and the installation easiness at the time of installation in a stand of a gas treatment apparatus was judged.

EXAMPLE 4

The same filter part as that of Example 3 was used. The formation method of the filter unit was also same as in Example 3 except that the thickness of flowing-in part of dies for a resin was changed. Consequently, the thickness of the filter holding frame was 1.0 mm, the rib thickness was 0.7 mm, and the rib width was 15 mm.

EXAMPLE 5

The same procedure as Example 4 was employed except that the number of gates was decreased to 4 points to obtain a filter unit having the thickness of the filter holding frame of 1.5 mm, the rib thickness of 0.5 mm, and the rib width of 10 mm. Hereinafter, the same as Example 1.

EXAMPLE 6

The same conditions as those in Example 3 were employed to obtain a filter unit having the thickness of the filter holding frame of 1.9 mm, the rib thickness of 0.9 mm, and the rib width of 15 mm. Hereinafter, the same as Example 1.

EXAMPLE 7

The same conditions as those in Example 3 were employed except that an elastomer resin [produced by Mitsui Chemicals Inc., MILASTOMER (trade name)] was used as a molding resin instead of the polypropylene resin.

EXAMPLE 8

The same conditions as those in Example 7 were employed except that no rib was formed.

COMPARATIVE EXAMPLE 6

The same conditions as those in Example 3 were employed for the filter part and filter unit formation method except that the number of gates was decreased to 2 points and no rib was formed.

COMPARATIVE EXAMPLE 7

The same conditions as those in Comparative Example 6 were employed for manufacturing the filter unit except that the thickness of the filter holding frame was slightly thinned.

COMPARATIVE EXAMPLE 8

The same conditions as those in Comparative Example 7 were employed for manufacturing the filter unit except that the number of gates was made to be 4 as same in Example 5.

Using the filter units obtained in the above-described methods, the properties and the capabilities, mainly the installation easiness, as a filter were evaluated and the results are shown in Table 2.

TABLE 2

| | | | | | | Evaluation | | | | |
|---|---|---|---|---|---|---|---|---|---|---|
| | Rib thickness (mm) | Rib width (mm) | The no. of gates | Holding frame thickness (mm) | Torsion (%) | Effective surface area of filter part (m$^2$) | Resin use amount (g) | Molding fraction defective (%) | Airborne dust removal efficiency (%) | Pressure loss (Pa) | Installation easiness |
| Example 3 | 0.5 | 6 | 6 | 1.5 | 100 | 0.178 | 47.3 | 0.6 | 52.3 | 155 | Excellent |
| Example 4 | 0.7 | 15 | 6 | 1.0 | 120 | 0.180 | 45.1 | 0.9 | 52.8 | 153 | Excellent |
| Example 5 | 0.5 | 10 | 4 | 1.5 | 60 | 0.178 | 47.7 | 1.25 | 52.2 | 155 | Excellent |
| Example 6 | 0.9 | 15 | 6 | 1.9 | 2 | 0.176 | 49.7 | 0.6 | 52.1 | 156 | Excellent |
| Example 7 | 0.5 | 6 | 6 | 1.5 | 25 | 0.178 | 47.3 | 1 | 52 | 155 | Excellent |
| Example 8 | — | — | 6 | 3 | 23 | 0.173 | 56.8 | 2 | 50 | 165 | Excellent |

TABLE 2-continued

| | Rib thickness (mm) | Rib width (mm) | The no. of gates | Holding frame thickness (mm) | Evaluation | | | | | |
|---|---|---|---|---|---|---|---|---|---|---|
| | | | | | Torsion (%) | Effective surface area of filter part (m²) | Resin use amount (g) | Molding fraction defective (%) | Airborne dust removal efficiency (%) | Pressure loss (Pa) | Installation easiness |
| Comparative Example 6 | — | — | 2 | 3 | 155 | 0.173 | 56.8 | 1.4 | 50.7 | 165 | Inferior |
| Comparative Example 7 | — | — | 2 | 2.5 | 160 | 0.175 | 53.5 | 2.6 | 51.3 | 161 | Inferior |
| Comparative Example 8 | — | — | 4 | 2.5 | 160 | 0.171 | 53.6 | 2.8 | 51.2 | 163 | Inferior |

What is claimed is:

1. A filter unit comprising
a filter part made of an adsorbent-bearing filtration material and
a filter holding frame made of a thermoplastic resin and integrally molded with said filter part, wherein the adsorbent of said filter part is packed to the position contacting said filter holding frame so as to increase effective surface area of said filtration material and increase collection efficiency.

2. The filter unit according to claim 1, characterized in that said filter holding frame has ribs in the side faces in the filtration material arrangement direction.

3. The filter unit according to claim 2, characterized in that the width of said ribs is 10 to 90% to the width of each side face of said filter holding frame in the filtration material arrangement direction and the thickness of said ribs is 10 to 70% to the thickness of each side face in the filtration material arrangement direction.

4. The filter unit according to claim 1, characterized in that said filter holding frame has 3 or more gates in the side faces in the filtration material arrangement direction.

5. The filter unit according to claim 1, characterized in that said thermoplastic resin is an olefin thermoplastic resin elastomer.

6. The filter unit according to claim 1, characterized in that said filter holding frame has 1% or higher torsion defined as the following equation:

$$\text{torsion} = [(L)/(W)] \times 100\%$$

[wherein, (L) denotes the distance in which the filter holding frame is moved owing to the strain when force is applied to the filtration material face in one end of the filter holding frame in the vertical direction while a side face in the opposed other end of the holding frame being fixed in the filtration material width direction; and (W) denotes the width of the holding frame.].

7. A filter unit comprising
a filter part made of a filtration material bearing an adsorbent in the entire surface in both width and length directions and a filter holding frame made of a thermoplastic resin, integrally molded with said filter part, and having 1% or higher torsion defined as the following equation:

$$\text{torsion} = [(L)/(W)] \times 100\%.$$

wherein (L) denotes the distance in which the filter holding frame is moved owing to the strain when force is applied to one end of the filter holding frame in the vertical direction to the filtration material face while a side face on the other opposed end of the filter holding frame being fixed in the width direction of the filtration material and (W) denotes the width of the holding frame.

8. The filter unit according to claim 7, characterized in that the thickness of said filter holding frame is 2 mm or thinner and said torsion is 25 to 150%.

9. The filter unit according to claim 7, characterized in that said filter holding frame has ribs in the side faces in the filtration material arrangement direction.

10. The filter unit according to claim 9, characterized in that the width of said ribs is 10 to 90% to the width of each side face of said filter holding frame in the filtration material arrangement direction and the thickness of said ribs is 10 to 70% to the thickness of each side face in the filtration material arrangement direction.

11. The filter unit according to claim 7, characterized in that said filter holding frame has 3 or more gates in the side faces in the filtration material arrangement direction.

12. The filter unit according to claim 7, characterized in that said thermoplastic resin is an olefin thermoplastic resin elastomer.

13. A method for manufacturing a filter unit comprising a process of installing a filter part made of an adsorbent-bearing a filtration material in the inside of dies and a process of forming a filter holding frame integrally with said filter part by pouring a thermoplastic resin to the inside of said dies in which said filter part is installed and characterized in that the clearance A of an escape part in said dies is controlled to be 80 to 115% to the thickness of said filtration material, the clearance B in a grip part is controlled to be 25 to 45% to the thickness of said filtration material, and the distance C of said grip part is controlled to be 0.5 to 5 mm.

14. The method for manufacturing a filter unit according to claim 13, characterized in that the process of integrally forming said filter part and said filter holding frame is carried out by simultaneous joining by an injection molding method.

15. The method for manufacturing a filter unit according to claim 13, characterized in that ribs are formed in the side faces of said filter holding frame in the filtration material arrangement direction.

16. The method for manufacturing a filter unit according to claim 13, characterized in that the width of said ribs is controlled to be 10 to 90% to the width of each side face of said filter holding frame in the filtration material arrangement direction and the thickness of said ribs is controlled to be 10 to 70% to the thickness of each side face in the filtration material arrangement direction.

17. The method for manufacturing a filter unit according to claim 13, characterized in that 3 or more gates are formed in the side faces of said filter holding frame in the filtration material width direction.

18. The method for manufacturing a filter unit according to claim 13, characterized in that the thickness of said filter holding frame is controlled to be 2 mm or thinner.

19. The method for manufacturing a filter unit according to claim 13, characterized in that said thermoplastic resin is an olefin thermoplastic elastomer.

* * * * *